Oct. 12, 1943.     G. FOX     2,331,465
HOT BLAST VALVE
Filed Dec. 15, 1941     2 Sheets-Sheet 1

INVENTOR.
Gordon Fox
BY
Wilkinson, Huxley, Byron & Knight
ATTYS

Oct. 12, 1943.　　　　G. FOX　　　　2,331,465
HOT BLAST VALVE
Filed Dec. 15, 1941　　　　2 Sheets-Sheet 2

INVENTOR.
Gordon Fox

Patented Oct. 12, 1943

2,331,465

UNITED STATES PATENT OFFICE 2,331,465

HOT-BLAST VALVE

Gordon Fox, Chicago, Ill., assignor to Freyn Engineering Company, Chicago, Ill., a corporation of Maine Application December 15, 1941, Serial No. 423,032

4 Claims. (Cl. 251—168)

The present invention relates to improvements in hot blast valves.

More particularly the present invention relates to valves such as are used in conjunction with conduits for carrying hot air and hot gas to and from a blast furnace. Such valves commonly have water-cooled seats, as well as a water-cooled closure member or gate. However, such valves as now known and used are subject to attack at the region between the water-cooled seats.

An object of the present invention is to provide an improved hot blast valve provided with means for protecting the parts thereof which are not sufficiently protected by the water-cooling features thereof.

A further object is to provide a hot blast valve having relatively simple means for protecting the region between the valve seats, which region is ordinarily subjected to high temperatures.

A further object is to provide a hot blast valve well adapted to meet the needs of commercial operation.

Further objects will appear as the description proceeds.

Referring to the drawings—

The hot blast valve chosen for illustration includes the casing 10 having the flanges 11—11 by means of which said casing may be secured intermediate of the length of a conduit for carrying hot air and hot gas. Mounted upon the casing 10 is the top portion 12. The upper extremity of the casing 10 forms, with said top portion 12, a recess adapted to receive the gate 13 when said gate is moved into valve opening position. Said gate 13 is ordinarily hollow, and is provided with means forming water passageways for the flow of water therethrough. Pipes 14 and 15 ordinarily serve the dual purpose of providing lifting means for the gate 13 and for providing for the ingress and exit of water to the interior of said gate 13.

The casing 10 is provided with two water-cooled seats 16—16 spaced apart a distance to permit sliding therebetween of the gate 13. Any preferred means may be provided for securely holding the valve seats 16—16 in proper relationship with the casing 10 and with the gate 13.

Figure 1:
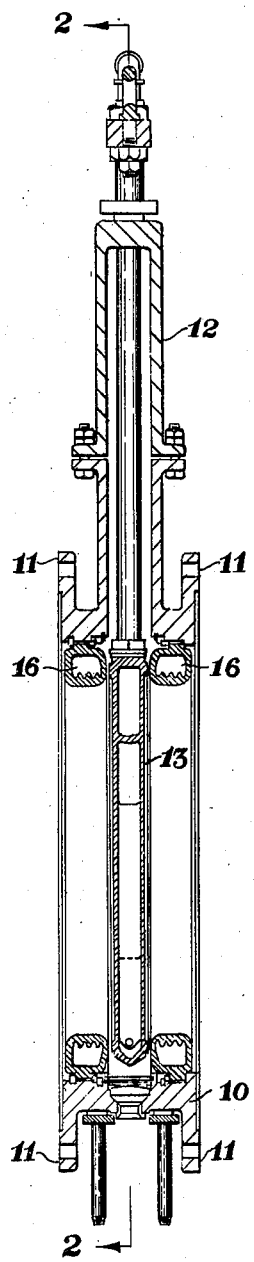
Figure 1 is a sectional view illustrating a hot blast valve embodying the principles of the present invention, said view being taken along a vertical plane which includes the axis of the passageway through said valve.
Figure 2:
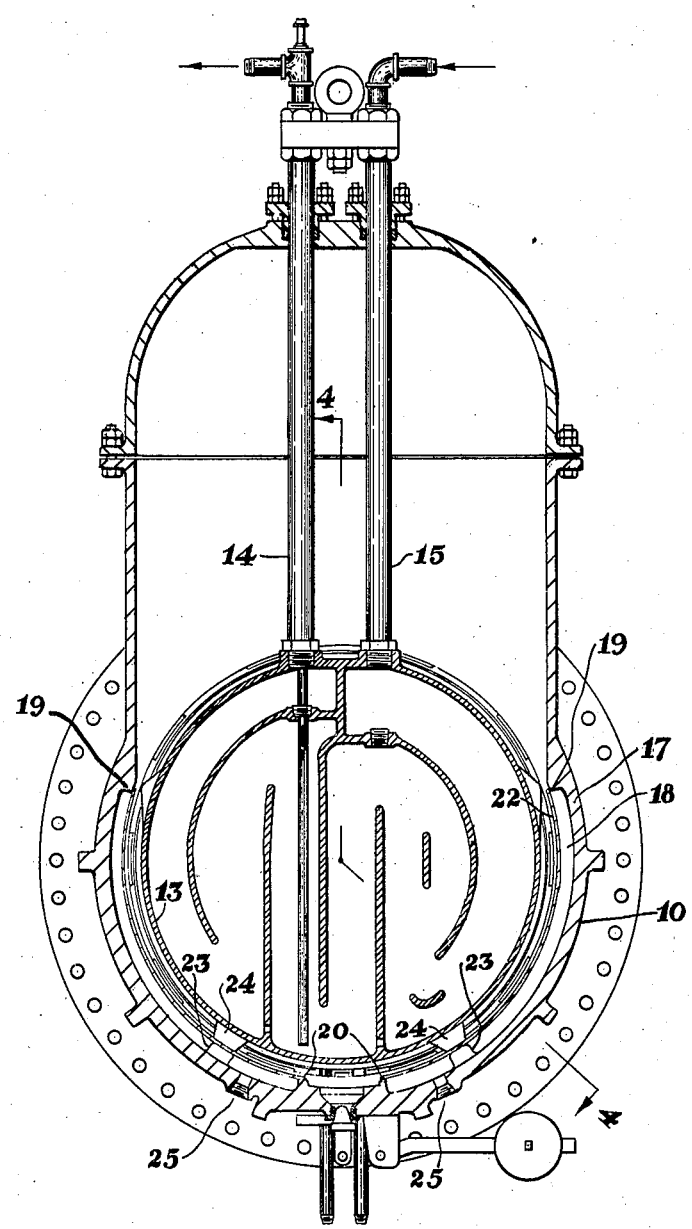
Figure 2 is a sectional view taken along the plane indicated by the arrows 2—2 of Figure 1.
Figure 3:
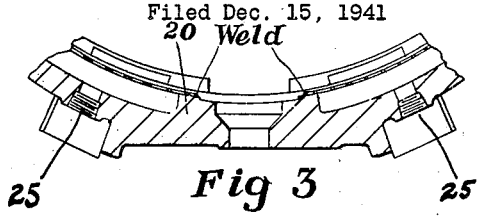
Figure 3 is a fragmentary view on an enlarged scale of a portion of Figure 2.
Figure 4:
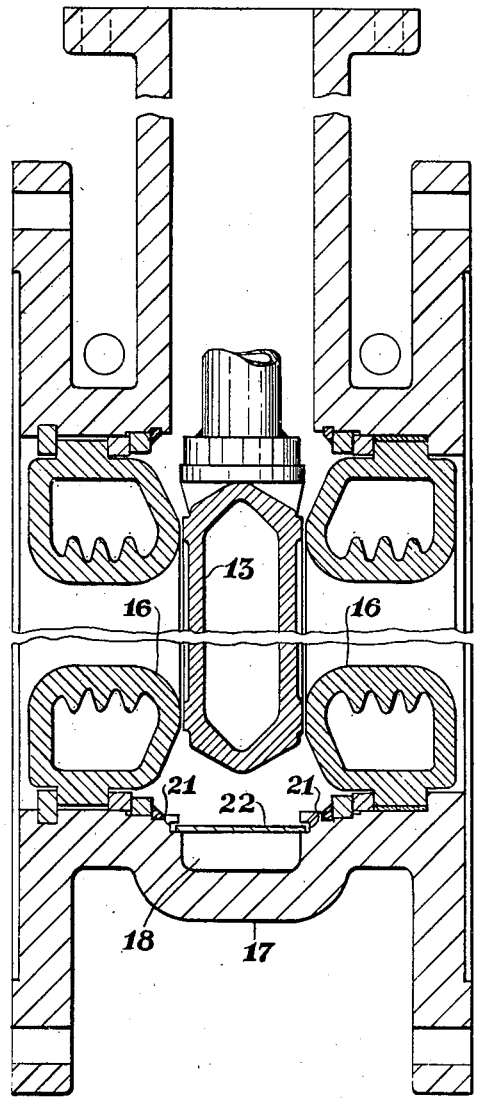
Figure 4 is a sectional view on an enlarged scale showing part of the structure illustrated in Figure 1, said Figure 4 being taken along the planes indicated by the arrows 4—4 of Figure 2.

As indicated in Figure 2, the portion 17 of the casing 10 adjacent to the valve seats 16—16 is of generally circular contour. The portion 17, between the valve seats 16—16, is provided with the recesses 18—18, each of said recesses 18 terminating at a corresponding shoulder 19 at one of its extremities above the level of the axis of the valve and at a corresponding shoulder 20 adjacent to the lowermost portion of the casing 10.

The side walls of the recesses 18—18 are provided with the slots 21—21 of arcuate contour facing each other. A strip of metal 22 is located within each pair of slots 21—21, one extremity of each of the strips 22—22 being secured, as for example by means of welding, to a corresponding shoulder 20. The other extremity of each of the strips 22—22 may have overlying relationship with a corresponding shoulder 19. Said strips 22—22 in conjunction with their corresponding recesses provide passageways for air, as will be described presently. Each of the strips 22 has a loose fit within its corresponding pair of slots 21, and by reason of the fact that each of said strips 22 is anchored at only one of its ends, expansion is permitted in width, thickness and length.

The valve casing 10 may be provided with the abutments 23—23, each underlying a corresponding strip 22. The bottom portion of the gate 13 may be provided with corresponding abutments 24—24 adapted to engage the strips 22—22 at regions adjacent to the abutments 23—23. Communication with each of the recesses 18 adjacent to the lowermost portion of the valve casing 10 is in an air inlet 25. It is possible to introduce a small amount of air through these air inlets 25—25, which air passes through the recesses 18—18, being discharged into the gas or air stream at the upper extremities of said recesses 18—18. The volume of air passing from the air inlets 25—25 through the recesses 18—18 may be so small that it does not have any appreciable influence upon the gas or air stream passing axially through the valve casing 10. However, the air passing through said recesses 18—18 does serve as a cooling medium for the strips 22—22.

The strips 22—22 serve as shields to protect the circumferential wall of the valve casing 10 at the region intermediate of the water-cooled valve seats 16—16. Therefore this portion of the valve casing 10 is protected from the direct radiation of the gas or air stream flowing axially through the valve casing. The strips 22—22 serve the further purpose of providing air spaces which have an insulating value in preventing the access of high temperature air or gases to the wall of the valve casing 10 above referred to. The flow of air from the air inlets 25—25 through the recesses 18—18 serves as a cooling medium not only for the strips 22—22 but for the circumferential wall of the valve casing 10 disposed outwardly of said strips.

The strips 22—22 may be made of special steel, or other metal available commercially, adapted to withstand successfully the high temperature attained by these strips.

By reason of the present invention, excessive temperature of the valve casing is avoided, and distortion of said casing with resultant leakage is avoided.

Though a preferred embodiment of the present invention has been described in detail, many modifications will occur to those skilled in the art. It is intended to cover all such modifications that fall within the scope of the appended claims.

What is claimed is:

1. In a valve, in combination, a valve casing providing an axial passageway, a gate slidably mounted in said casing to control said axial passageway, said casing being provided with a water-cooled seat, and a strip of heat-resisting metal mounted in said casing adjacent to said seat but axially displaced therefrom in protective relationship with the wall of said casing adjacent to said seat, said strip having a contour conforming in general to the adjacent contour of said gate, said strip being carried by said valve casing in a manner to permit expansion of said strip relative to said casing.

2. In a valve, in combination, a valve casing providing an axial passageway, a gate slidably mounted in said casing to control said axial passageway, said casing being provided with a pair of water-cooled seats spaced apart a distance sufficient to receive said gate, the wall of said casing being provided with a pair of circumferential recesses, strips of heat resisting material, each having an extremity secured to said wall and each covering its corresponding recess to form a passageway, the other extremities of each of said strips being supported by said wall but free to move upon said wall, each of said passageways being open to a supply of air at one of its extremities and being open to said axial passageway at the other of its extremities.

3. In a valve, in combination, a valve casing providing an axial passageway, a gate slidably mounted in said casing to control said axial passageway, said casing being provided with a pair of water-cooled seats spaced apart a distance sufficient to receive said gate, the wall of said casing being provided with a pair of circumferential recesses, strips of heat resisting material, each having an extremity secured to said wall and each covering its corresponding recess to form a passageway, the other extremities of each of said strips being supported by said wall but free to move upon said wall, each of said passageways being open to a supply of air at one of its extremities and being open to said axial passageway at the other of its extremities, said wall in the regions of said recesses being provided with abutments underlying said strips, said gate being provided with abutments adapted to engage said strips at regions adjacent to said first-mentioned abutments.

4. In a valve, in combination, a valve casing providing an axial passageway, a gate slidably mounted in said casing to control said axial passageway, said casing being provided with a pair of water-cooled seats spaced apart a distance sufficient to receive said gate, the wall of said casing being provided with a pair of circumferential recesses, strips of heat resisting material, each having an extremity secured to said wall and each covering its corresponding recess to form a passageway, the other extremities of each of said strips being supported by said wall but free to move upon said wall.

GORDON FOX.